United States Patent [19]

Tamura

[11] Patent Number: 4,498,564
[45] Date of Patent: Feb. 12, 1985

[54] DISC BRAKE SUBASSEMBLY HAVING FRICTION PAD RETAINING MEANS

[75] Inventor: Koichi Tamura, Tokyo, Japan

[73] Assignee: Tokico Ltd., Kawasaki, Japan

[21] Appl. No.: 418,175

[22] Filed: Sep. 14, 1982

[30] Foreign Application Priority Data

Sep. 18, 1981 [JP] Japan .................. 56-138503

[51] Int. Cl.³ .............. F16D 55/224; F16D 65/02
[52] U.S. Cl. ..................... 188/73.32; 188/73.39
[58] Field of Search ............ 188/18 A, 73.1, 73.2, 188/73.31, 73.32, 73.33, 73.34, 73.35, 73.36, 73.37, 73.38, 73.39, 73.43, 73.44, 73.45, 206 R, 206 A

[56] References Cited

U.S. PATENT DOCUMENTS

| | | | |
|---|---|---|---|
| 2,909,246 | 10/1959 | Hodkinson | 188/73.32 |
| 3,605,956 | 9/1971 | Hahm et al. | 188/73.32 |
| 4,352,414 | 10/1982 | Scott | 188/73.34 |
| 4,394,891 | 7/1983 | Oshima | 188/73.38 |

FOREIGN PATENT DOCUMENTS

| | | | |
|---|---|---|---|
| 2046855A | 11/1980 | United Kingdom | 188/73.36 |
| 1585159 | 2/1981 | United Kingdom | 188/73.38 |

Primary Examiner—Douglas C. Butler
Assistant Examiner—R. R. Diefendorf
Attorney, Agent, or Firm—Wenderoth, Lind & Ponack

[57] ABSTRACT

A floating caliper type disc brake wherein a caliper having two leg portions and a bridge portion straddles a rotatable disc and a pair of opposing friction pads are slidably mounted on a carrier. An axially elongated radial opening is formed in the bridge portion of the caliper to displaceably receive therein radially outwardly projecting projections formed on respective friction pads, and a guide member is located on the outer edge of the opening to engage with and retain respective retaining portions formed on respective projections. Pad springs act between the caliper and the friction pads for biasing the friction pads radially inwardly with respect to the caliper.

4 Claims, 5 Drawing Figures

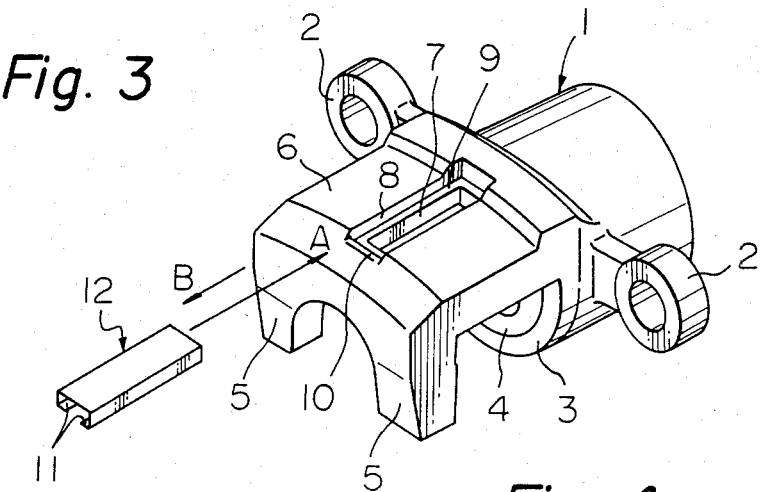
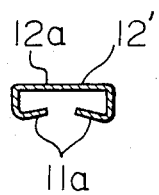
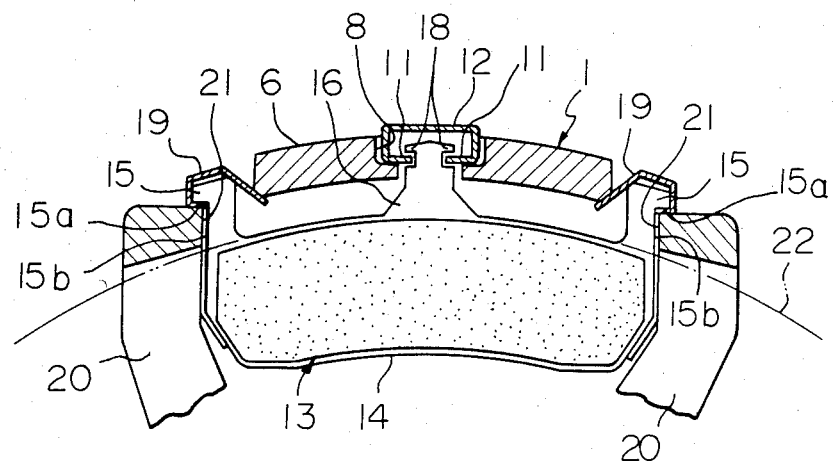

DISC BRAKE SUBASSEMBLY HAVING FRICTION PAD RETAINING MEANS

BACKGROUND OF THE INVENTION

This invention relates to a disc brake and, more particularly, to a floating caliper type disc brake which includes a caliper adapted to be slidably mounted on a stationary carrier and consisting of opposing leg portions and a bridge portion which straddles the outer circumference of a rotatable disc and connects the leg portions, and a pair of friction pads disposed on opposite sides of the disc and mounted slidably on the carrier.

Usually, a disc brake of this kind is mounted on a vehicle by securing the carrier to a non-rotatable part of a vehicle such as a knuckle member by utilizing a pair of bolts or the like with the caliper and friction pads being assembled with the carrier beforehand. However, for reducing the weight of the vehicle and for minimizing the number of parts, it has been proposed to form the carrier integrally with the knuckle member of the vehicle and to mount thereon an assembly consisting of the caliper and friction pads, and which is usually called a direct mounting type disc brake.

There is a problem in the direct mounting type disc brake that the parts such as the caliper, friction pads, pad spring and the like are produced by respective specialized parts makers and delivered to a car maker wherein the assembling operation is performed by the car maker. This is troublesome and time consuming, thereby decreasing the productivity and complicating the controlling of parts.

SUMMARY OF THE INVENTION

The present invention aims to solve the problem aforementioned and, according to the invention, an opening is formed in the bridge portion of the caliper extending therethrough in the direction of the radius of the disc and being elongated in the direction of the axis of the disc; a projection is formed on each of friction pads to project radially outwardly with respect to the disc and is displaceably positioned in the opening in the bridge portion of the caliper; a retaining portion is formed on the projection of each friction pad; an elongated guide member having a generally C shaped cross section is located on the radially outer edge of the opening with opposing spaced edges of the guide member engaging the retaining portion of the projection of each friction pad; and a pad spring is disposed between the friction pad and the caliper to bias the friction pad radially inwardly with respect to the caliper.

Thus, the caliper, the friction pads, the guide member and the pad spring can constitute a sub-assembly which can easily and quickly be assembled with the carrier thereby simplifying the assembling operation and improving the productivity of the disc brake.

BRIEF DESCRIPTION OF THE DRAWINGS

The invention will now be explained in detail in connection with attached drawings which exemplify some preferred embodiments of the invention, and in which:

FIG. 3 is a perspective view of a caliper and a guide member of the dis brake of FIG. 1;

FIG. 4 is a sectional view of a modified guide member; and

FIG. 5 is a sectional view of the disc brake similar to FIG. 2 with the caliper being mounted on the carrier.

DETAILED DESCRIPTION OF THE PREFERRED EMBODIMENT

Figure 1:
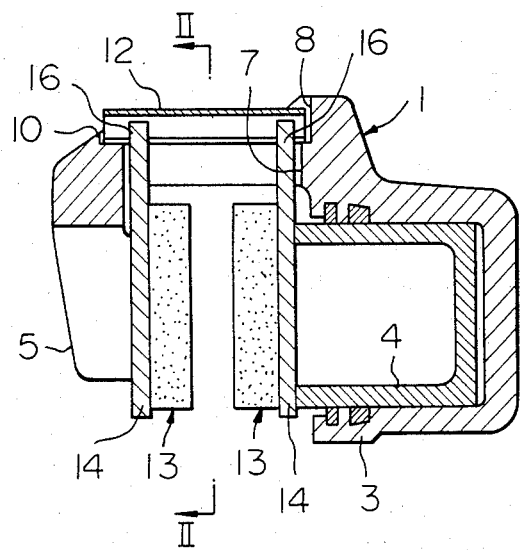
FIG. 1 is a longitudinally sectioned side view of the disc brake according to the invention with the carrier omitted.

The disc brake shown in the drawings comprises a caliper 1 having mounting portions 2, a first leg 3, a second leg 5 and a bridge portion 6 connecting the first and second legs 3 and 5. A cylinder bore is formed in the first leg 3 to receive slidably therein a piston 4. The aforesaid construction of the caliper is conventional and in the assembled condition of the disc brake, the caliper is slidably mounted on a carrier by two parallel bolts (not shown) mounted on the carrier passing slidably through mounting portions 2, and the bridge portion 6 straddles the outer circumference of a rotatable disc.

According to the invention, an opening 7 is formed in the bridge portion 6 and extends therethrough in the direction of the radius of the disc or in the vertical direction in FIG. 1. The opening 7 is elongated in the direction of the axis of the disc or in the horizontal direction in FIG. 1. The outer edge of the opening 7 has a radially outwardly facing shoulder 9 therearound having a generally rectangular configuration, and the shoulder 9 is surrounded by a generally vertical wall 8. The shoulder 9 and the wall 8 define a recess encircling the outer edge of the opening 7. The height of the wall 8 is reduced at one axial end shown at reference numeral 10. An elongated guide member 12 formed of a resilient material such as spring steel is located in the recess 8, 9. The guide member 12, which can be a resilient material, has a generally C shaped or rectangular shaped cross section having inwardly directed flange portions 11 defining spaced opposing edges, and in the unstressed condition, the flange portions 11 are spaced from the main lateral plate 11a to leave a space therebetween. The guide member 12 is fitted on the bridge portion 6 by sliding the guide member 12 in the direction of arrow A as viewed in FIG. 3. The reduced height portion 10 of the wall 8 serves to simplify the fitting operation.

A pair of friction pads 13 are disposed between the cylinder 4 and the second leg 5 of the caliper 1. Each friction pad 13 comprises a backing plate 14 and a friction material secured thereto. On the upper central portion the backing plate 14 has a projection 16 projecting in the radially outward direction, and the backing plate 14 has a pair of mounting portions 15 for mounting the friction pad on a carrier 20.

The projections 16 of the friction pads 13 are loosely fitted in the opening 7. The distal ends of the projections 16 have retaining portions 18 projecting laterally therefrom. In the embodiment, each retaining portion 18 is defined by a pair of grooves 17. The flange portions 11 of the guide member 12 slide under the retaining portions 18 as the guide member 12 is moved in the direction of arrow A as described above, whereby the friction pads 13 are retained on the caliper 1 by the guide member 12.

Figure 2:
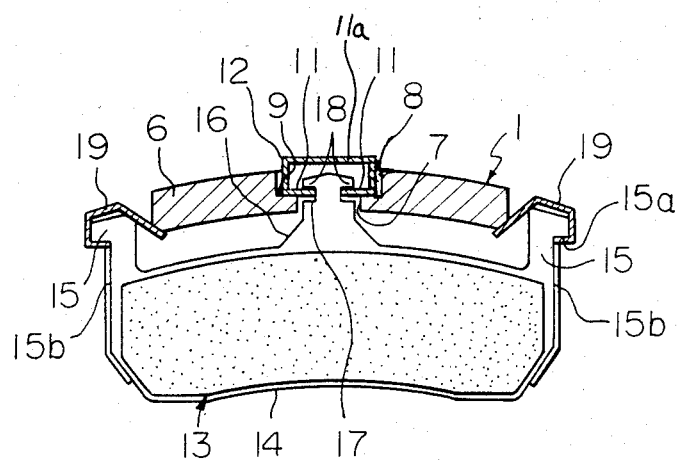
FIG. 2 is a sectional view taken along line II—II in FIG. 1.

On the opposite ends of the friction pads 13 there are mounted pad springs 19 as shown in FIG. 2. Each pad spring 19 is formed of a leaf spring material and the lower portion extends downwardly along the side surface of the backing plate 14 with the lower end engaging with the lower portion of the backing plate 14. The upper portion of the pad spring 19 encircles the mounting portion 15 of the backing plate 14 and extends to and engages with the lower surface of the bridge portion 6 of the caliper 1 so that the friction pad 13 is biased by the pad springs 19 in a direction radially inwardly from the caliper 1.

Thus, the caliper 1, the friction pads 13, the guide member 12 and the pad springs 19 constitute a sub-assembly as shown in FIGS. 1 and 2, wherein the friction pads are retained on the caliper by the guide member 12 engaging with the retaining portions of the friction pads.

The sub-assembly can be assembled at a parts maker and delivered to a car maker. Thus, it is possible to finally assemble the disc brake by simply mounting the sub-assembly on a carrier as shown in FIG. 5, wherein shown at 20 is a carrier which may integrally be formed with a knuckle member of the vehicle. The carrier has a pair of circumferentially spaced guiding portions 21. The mounting portions 15 of the friction pads 13 have respectively generally horizontally or circumferentially extending surfaces 15a for slidably mounting the friction pads on the carrier 20, and have respectively generally radially extending torque transmitting surfaces 15b for cooperating with correspondingly shaped surfaces on the guiding portions 21 of the carrier 20. The pad springs 19 are, as shown in FIG. 5, interposed between the surfaces 15a and 15b of the friction pads and the guiding portions 21 of the carrier 20. Thus, the rattling movement of the friction pads or the caliper with respect to the carrier can be prevented and, further, since the carrier and the friction pads do not contact directly, it is possible to prevent the sticking phenomenon or excessive wear therebetween.

It will be understood that the engagement between the projections 16 of the friction pads 13 and the guide member 12 is effective only when the caliper is not mounted on the carrier and, therefore, in the assembled condition as shown in FIG. 5, there may be a clearance between the guide member 12 and the projections 16. However, for preventing the rattling of the guide member 12 with respect to the caliper 1, it is preferable that the guide member 12 resiliently engage with the projections with a light force particularly in the radial direction. FIG. 4 shows a modified form of the guide member wherein the inwardly directed flanges 11a are slightly upwardly bent in the initial condition.

As described heretofore, according to the invention, an opening is formed in the bridge portion of the caliper to receive slidably therein respective projections on the friction pads, and a guide member is located on the outer edge of the opening in the bridge portion of the caliper to engage with the projections and, further, the caliper and the friction pads are resiliently biased by pad springs in the direction away from each other. Thus, the friction pads are resiliently retained on the caliper when the caliper is not mounted on the carrier. Therefore, the disc brake can easily be assembled even though the carrier is integral with a part such as a knuckle member of a vehicle, thereby simplifying the assembling operation, and improving the productivity.

It will be noted that the invention is particularly adapted for disc brakes wherein the carrier is integral with a part such as a knuckle member of a vehicle. However, the invention may be applied to disc brakes of other types.

What is claimed is:

1. A disc brake subassembly comprising:
    a caliper adapted to be slidably mounted on a stationary carrier integrally formed on the body of a vehicle, said caliper consisting of spaced opposing leg portions and a bridge portion connecting said leg portions and being for straddling the outer circumference of a rotatable disc;
    a pair of friction pads for acting on opposite surfaces of the disc and being adapted to be slidably mounted on the carrier;
    said bridge portion of said caliper having an opening extending therethrough in the direction of the radius of the disc, said opening being elongated in the direction of the axis of the disc;
    a projection on each of said friction pads and projecting radially outwardly with respect to the disc and radially outwardly of the edge of said opening on the radially outer side of said bridge portion and having on the distal end thereof a retaining portion, said projection being received in said opening;
    an elongated guide member having a generally C-shaped cross-section on the radially outer side of said opening and having flange portions directed inwardly of said C-shaped guide member with opposing spaced edges, the flanges being normally spaced from the remainder of the cross-section of said C-shaped guide member for being positioned between the retaining portions of said brake pads and the outer side of said bridge portion, whereby said guide member can be slidably moved along the radially outer side of said bridge portion along said opening for sliding said flange portions between said retaining portions and said bridge portion; and
    pad springs between said caliper and said friction pads for radially inwardly biasing said friction pads with respect to said caliper.

2. A disc brake as set forth in claim 1 wherein said guide member is formed of a resilient material.

3. A disc brake as set forth in claim 1 wherein each said pad spring includes a portion interposed between relatively sliding surfaces of the carrier and said friction pads.

4. A disc brake as set forth in claim 1 wherein said radially outer edge of the opening in the caliper has a generally rectangular shaped radially outwardly facing shoulder and a correspondingly shaped radial wall surrounding said shoulder and defining a recess in the radially outer surface of the bridge portion and into which said guide member fits.

* * * * *